(12) United States Patent
Kawashima et al.

(10) Patent No.: US 8,274,193 B2
(45) Date of Patent: Sep. 25, 2012

(54) ELECTRIC MOTOR

(75) Inventors: Yoshichika Kawashima, Kiryu (JP); Naoki Shioda, Kiryu (JP)

(73) Assignee: Mitsuba Corporation, Gunma (JP)

( * ) Notice: Subject to any disclaimer, the term of this patent is extended or adjusted under 35 U.S.C. 154(b) by 163 days.

(21) Appl. No.: 12/735,586

(22) PCT Filed: Jan. 28, 2009

(86) PCT No.: PCT/JP2009/051361
§ 371 (c)(1), (2), (4) Date: Jul. 29, 2010

(87) PCT Pub. No.: WO2009/096426
PCT Pub. Date: Aug. 6, 2009

(65) Prior Publication Data
US 2010/0308681 A1    Dec. 9, 2010

(30) Foreign Application Priority Data

Jan. 31, 2008  (JP) .................................. 2008-021660

(51) Int. Cl.
*H02K 3/00*    (2006.01)
(52) U.S. Cl. .......................... 310/233; 310/198; 310/179
(58) Field of Classification Search .................. 310/179, 310/184, 198, 233, 234
See application file for complete search history.

(56) References Cited

U.S. PATENT DOCUMENTS

| 5,376,852 | A | * | 12/1994 | Kawamura et al. | ........... 310/198 |
| 2003/0202893 | A1 | | 10/2003 | Moroto et al. | |
| 2004/0256944 | A1 | * | 12/2004 | Kaneko | ........................ 310/233 |
| 2006/0055262 | A1 | * | 3/2006 | Kaneko | .................... 310/154.06 |
| 2007/0007838 | A1 | | 1/2007 | Kuroda | |
| 2007/0069603 | A1 | * | 3/2007 | Terada et al. | ................. 310/234 |

FOREIGN PATENT DOCUMENTS

CN    1455501    11/2003

(Continued)

OTHER PUBLICATIONS

Office Action mailing date of Apr. 6, 2012 on the underlying Application No. 200980103440.7 with English translation thereof.

*Primary Examiner* — Quyen Leung
*Assistant Examiner* — Leda Pham
(74) *Attorney, Agent, or Firm* — Kenyon & Kenyon LLP

(57) ABSTRACT

The windings (12) wound around each of the teeth (9) form two coil groups (71, 72) of three-phase concentrated windings which are disposed point-symmetrically to each other with respect to the rotational shaft. Each of the coil groups (71, 72) includes a first coil (33), in which the windings (12) are wound around the teeth in a forward direction, and a second coil (34), in which the windings (12) are wound around the teeth in a reverse direction. When each of the teeth (9) is allocated with a U phase, a V phase, and a W phase in this order in a circumferential direction so that the first coil (33) wound for each phase is set to be coils of the U phase, the V phase, and the W phase, and the second coil (34) wound for each phase is set to be coils of the -U phase, the -V phase, and the -W phase, the coils of the U, -W, V, -U, W and -V phases are electrically connected between the adjacent segments (14) in this order.

6 Claims, 7 Drawing Sheets

FOREIGN PATENT DOCUMENTS

| | | |
|---|---|---|
| CN | 1897407 | 1/2007 |
| EP | 1 367 261 | 12/2003 |
| EP | 1 744 438 | 1/2007 |
| JP | 2000-341892 | 12/2000 |
| JP | 2003-116248 | 4/2003 |
| JP | 2004-28083 | 1/2004 |
| JP | 2004-328987 | 11/2004 |
| JP | 2007-49884 | 2/2007 |
| JP | 2007-202391 | 8/2007 |

* cited by examiner

PRIOR ART

ELECTRIC MOTOR

TECHNICAL FIELD

The present invention relates to an electric motor which is mounted on a vehicle or the like.

This application claims priority to and the benefit of Japanese Patent Applications No. 2008-021660 filed on Jan. 31, 2008, the disclosure of which is incorporated herein by reference.

BACKGROUND ART

Generally, a three-phase electric motor with a brush which is mounted on a vehicle or the like includes a cylindrical yoke having permanent magnets attached to its inner circumference, and an armature wound with an armature coil and rotatably disposed in the yoke. The armature includes an armature core externally fitted and fixed to a rotational shaft. The armature core is provided with a plurality of teeth in a radial direction, and elongated slots are formed between the teeth in an axial direction. A winding is wound around each of the teeth to form a coil of a three-phase (U-phase, V-phase and W-phase) structure.

Coils are in electrical communication with a plurality of segments attached to the rotational shaft, respectively. Each of the segments is adapted to come into slide contact with the brush, and applies a voltage to the segment from the brush to supply a current to each coil. In this instance, the phases of the currents flowing through the coils alternate, so that different magnetic fields are produced from the coils, respectively. The rotational shaft is rotated by magnetic attraction or repulsive force which is generated between the yoke and the magnet. In addition, the segment which comes into slide contact with the brush is sequentially changed by the rotation, and the direction of the current flowing in the coil is converted, that is, rectification is performed, so that the armature is continuously rotated.

One example of the winding structure of each coil according to the related art will be described with reference to FIG. 7.

FIG. 7 is a developed view of an armature 103 according to the related art to illustrate a winding state of a coil 107, in which a segment 104 and teeth 109 are shown. An air gap between the adjacent teeth 109 corresponds to a slot 101. In this instance, each segment 104 and a winding 102 wound around each of the teeth 109 will be described using the designated reference numerals in FIG. 7.

As shown in FIG. 7, the armature 103 of the related art is provided with 6 slots 101 and 6 segments 104. In each of the segments 104, the segments 104 having the same potential are connected via a short circuit line 125. In addition, a capacitor 126 is connected between the adjacent segments 104.

The winding 102 is first wound around an a1 tooth 109 to form an a1 coil 107, for example, in a case where a winding starting end portion 30 starts to wind from an S1 segment 104. In addition, the winding 102, which starts to wind from an S2 segment 104, is wound around a b1 tooth 109 to form a b1 coil 107. Moreover, the winding 102, which starts to wind from an S3 segment 104, is wound around a c1 tooth 109 to form a c1 coil 107. Winding terminating end portions of the a1 coil 107, the b1 coil 107 and the c1 coil 107 are connected to each other to form a central point 200 of a star wiring. The winding 102, which starts to wind from an S4 segment 104, an S5 segment 104 and an S6 segment 104, is wound around an a2 tooth 109, a b2 tooth 109 and a c2 tooth 109. The winding terminating end portions of the coils are connected to each other to form another central point 200 of star wiring.

In the winding structure of the winding 102, two parallel circuits are formed. That is, one circuit is formed by the a1 coil 107, the b1 coil 107 and the c1 coil 107, and simultaneously, another circuit is formed by the a2 coil 107, the b2 coil 107 and the c2 coil 107 (e.g., refer to Patent Document 1).

However, in the above-described related art, in the case where the winding is wound in a three-phase concentrated winding manner, the number of the parallel circuits is two, irrespective of the number of the slots, so that there is a limit in rendering the diameter of the winding thin. For this reason, since it is necessary to render the line diameter of the winding thick, it is difficult to perform the winding task.

Patent Document 1: Japanese Patent Application, First Publication No. 2004-328987

DISCLOSURE OF INVENTION

Problem to be Solved by the Invention

The invention has been achieved in view of the above circumstances, and it is an object of the present invention to provide an electric motor capable of easily performing a winding task even in a case where a winding is wound in a three-phase concentrated winding manner.

To solve the above-described problem, a first aspect of the present invention is an electric motor including: a rotational shaft rotatably supported by a yoke having a plurality of magnetic poles; a plurality of teeth attached to the rotational shaft and extending in a radial direction to allow windings to be wound therearound; an armature core formed between the teeth and provided with a plurality of slots which extend in an axial direction; a commutator installed on the rotational shaft adjacent to the armature core and having a plurality of segments which are disposed in a circumferential direction; and a short-circuit member which short-circuits the segments having the same potential, among the plurality of segments, wherein the number P of magnetic poles, the number Sr of the slots, and the number Se of the segments are set in order to satisfy P=4A, Sr=6A, and Se=12A, when A is a natural number of 2 or more, the number of the magnetic poles is P, the number of the slots is Sr, and the number of the segments is Se, and the windings wound around each of the teeth form two coil groups of three-phase concentrated windings which are disposed point-symmetrically to each other with respect to the rotational shaft, wherein each of the coil groups includes a first coil, in which the windings are wound around the teeth in a forward direction, and a second coil, in which the windings are wound around the teeth in a reverse direction, and when each of the teeth is allocated with a U phase, a V phase, and a W phase in this order in a circumferential direction so that the first coil wound for each phase is set to be coils of the U phase, the V phase, and the W phase, and the second coil wound for each phase is set to be coils of the −U phase, the −V phase, and the −W phase, the coils of the U, −W, V, −U, W and −V phases are electrically connected between the adjacent segments in this order.

A second aspect of the present invention is an electric motor including: a rotational shaft rotatably supported by a yoke having a plurality of magnetic poles; a plurality of teeth attached to the rotational shaft and extending in a radial direction to allow windings to be wound therearound; an armature core formed between the teeth and provided with a plurality of slots which extend in an axial direction; a commutator installed on the rotational shaft adjacent to the armature core and having a plurality of segments which are disposed in a circumferential direction; and a short-circuit member which short-circuits the segments having the same potential, among the plurality of segments, wherein the number P of magnetic poles, the number Sr of the slots, and the number Se of the segments are set in order to satisfy P=4A, Sr=6A, and Se=12A, when A is a natural number of 2 or more, the number of the magnetic poles is P, the number of the slots is Sr, and the number of the segments is Se, and each of the teeth is allocated with U, V and W phases in this order in a circumferential direction, wherein the windings are wound in series around the teeth of three phases, which are at intervals of three teeth in a concentrated winding manner to form one coil group, so that two coil groups are formed on the armature cores, each of the coil groups includes a first coil, in which the windings are wound around the teeth in a forward direction, and a second coil, in which the windings are wound around the teeth in a reverse direction, and when the first coil wound for each phase is set to be coils of the U, V and W phases, and the second coil wound for each phase is set to be coils of the −U, −V and −W phases, the coils of the U, −W, V, −U, W and −V phases are electrically connected between the adjacent segments in this order.

A third aspect of the present invention is the electric motor according to claim 1 or 2, wherein the electric motor has an 8-pole, 12-slot and 24-segment structure, in which the number of the magnetic poles is 8, the number of the slots is 12, and the number of the segments is 24, and the first coil and the second coil constituting each coil group have two coils of the same phase.

A fourth aspect of the present invention is an electric motor including: a rotational shaft rotatably supported by a yoke having a plurality of magnetic poles; a plurality of teeth attached to the rotational shaft and extending in a radial direction to allow windings to be wound therearound; an armature core formed between the teeth and provided with a plurality of slots which extend in an axial direction; a commutator installed on the rotational shaft adjacent to the armature core and having a plurality of segments which are disposed in a circumferential direction; and a short-circuit member which short-circuits the segments having the same potential, among the plurality of segments, wherein the number P of magnetic poles, the number Sr of the slots, and the number Se of the segments are set in order to satisfy P=4A, Sr=6A, and Se=6A, when A is a natural number of 2 or more, the number of the magnetic poles is P, the number of the slots is Sr, and the number of the segments is Se, and the windings wound around each of the teeth form two coil groups of three-phase concentrated windings which are disposed point-symmetrically to each other with respect to the rotational shaft, wherein when each of the teeth is allocated with U, V, and W phases in this order in a circumferential direction, and the windings wound for each phase are set to be coils of the U, V, and W phases, a winding terminating end portion of the coil of the W phase in one coil group and a winding starting end portion of the coil of the U phase in the other coil group are connected to each other, and a winding starting end portion of the coil of the U phase in one coil group and a winding terminating end portion of the coil of the W phase in the other coil group are connected to each other, and the coils of the U, V, and W phases are electrically connected between the adjacent segments in this order.

A fifth aspect of the present invention is an electric motor including: a rotational shaft rotatably supported by a yoke having a plurality of magnetic poles; a plurality of teeth attached to the rotational shaft and extending in a radial direction to allow windings to be wound therearound; an armature core formed between the teeth and provided with a plurality of slots which extend in an axial direction; a commutator installed on the rotational shaft adjacent to the armature core and having a plurality of segments which are disposed in a circumferential direction; and a short-circuit member which short-circuits the segments having the same potential, among the plurality of segments; wherein the number P of magnetic poles, the number Sr of the slots, and the number Se of the segments are set in order to satisfy P=4A, Sr=6A, and Se=6A, when A is a natural number of 2 or more, the number of the magnetic poles is P, the number of the slots is Sr, and the number of the segments is Se, each of the teeth is allocated with U, V, and W phases in this order in a circumferential direction, and the windings are wound in series around the teeth of three phases which are at intervals of three teeth in a concentrated winding manner to form one coil group, so that two coil groups are formed in the armature core, wherein when the windings wound for each phase are set to be coils of the U, V, and W phases, a winding starting end portion of the coil of the U phase in one coil group and a winding terminating end portion of the coil of the W phase in the other coil group are connected to each other, and the coils of the U, V, and W phases are electrically connected between the adjacent segments in this order.

A sixth aspect of the present invention is the electric motor according to claim 4 or 5, wherein the electric motor has an 8-pole, 12-slot and 12-segment structure, in which the number of the magnetic poles is 8, the number of the slots is 12, and the number of the segments is 12, and each coil group has two coils of the same phase.

EFFECT OF THE INVENTION

According to the present invention, since two coil groups of three-phase concentrated windings can be connected in parallel to a segment of a commutator, the number of parallel circuits can be increased to 4. For this reason, as compared with a case where the number of parallel circuits is two, it is possible to utilize a winding with a thin line diameter. As the line diameter is thin, it is possible to easily perform the winding task on the winding.

In addition, if A is a natural number of 2 or more, the number of the magnetic poles is P, the number of the slots is Sr, and the number of the segments is Se, in order to satisfy P=4A, Sr=6A, and Se=12A, the number P of the magnetic poles, the number Sr of the slots and the number Se of the segments are set, and thus the number Se of the segments is twice the number Sr of the slots. For this reason, as compared with the related art in which the number of the segments is set to be equal to the number of the slots, it is possible to decrease the voltage between the segments. Therefore, it is possible to suppress the discharge from being produced between the segment and the brush which comes into slide contact with the segment.

In addition, in the case in which the number Se of the segments is twice the number Sr of the slots, the coil of each phase is configured of a first coil wound in a forward direction, and a second coil wound in a reverse direction, so that the center of rectification for every phase can be set to the center between the adjacent segments. For this reason, the center of rectification for each phase can be easily recognized, and thus each of the brushes is installed such that the center of rectification and the center of the brush coincide, thereby improving the rectifying characteristics and thus improving the characteristics of the electric motor.

REFERENCE SYMBOLS 1, 51: electric motor, 2: yoke, 3: armature, 4: permanent magnet (magnetic pole), 5: rotational shaft, 6: armature core, 7: armature coil (coil), 9: tooth, 11, 11a to 11f: slot, 12: winding, 13: commutator, 14, 14a to 14q: segment, 21: brush, 30: winding starting end portion, 33: first coil, 33a, 33b: forward winding coil, 34: second coil, 34a, 34b: reverse winding coil, 40: winding terminating end portion, 71, 81: first coil group, 72, 82: second coil group

BEST MODE FOR CARRYING OUT THE INVENTION

Next, a first embodiment of the present invention will be described with reference to FIGS. 1 to 4.

Figure 1:
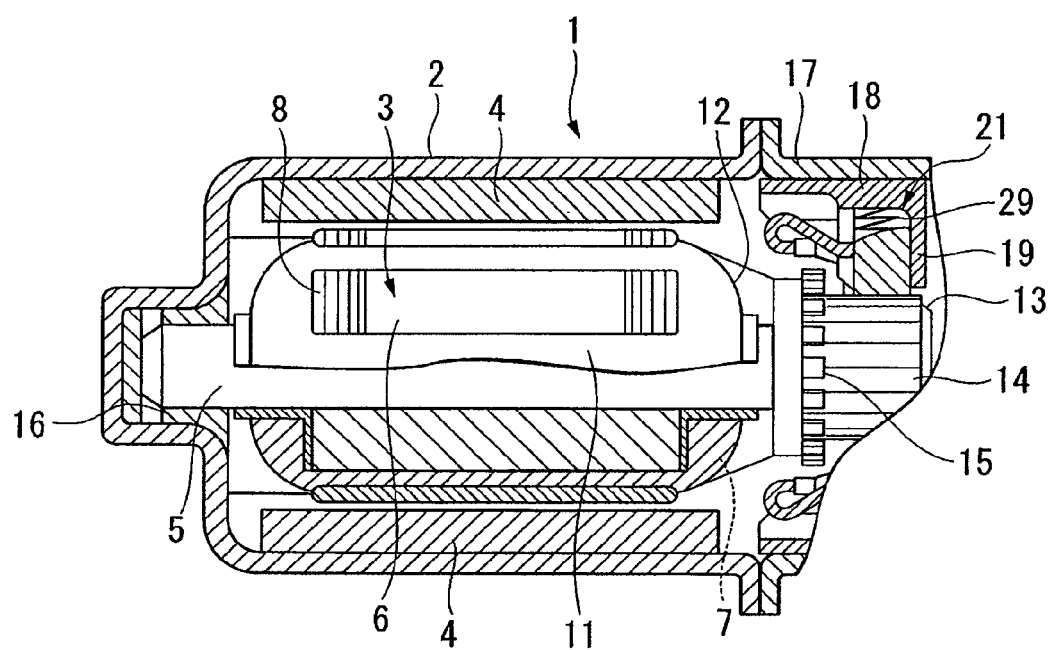
FIG. 1 is a longitudinal cross-sectional view of an electric motor according to a first embodiment of the present invention.
Figure 2:
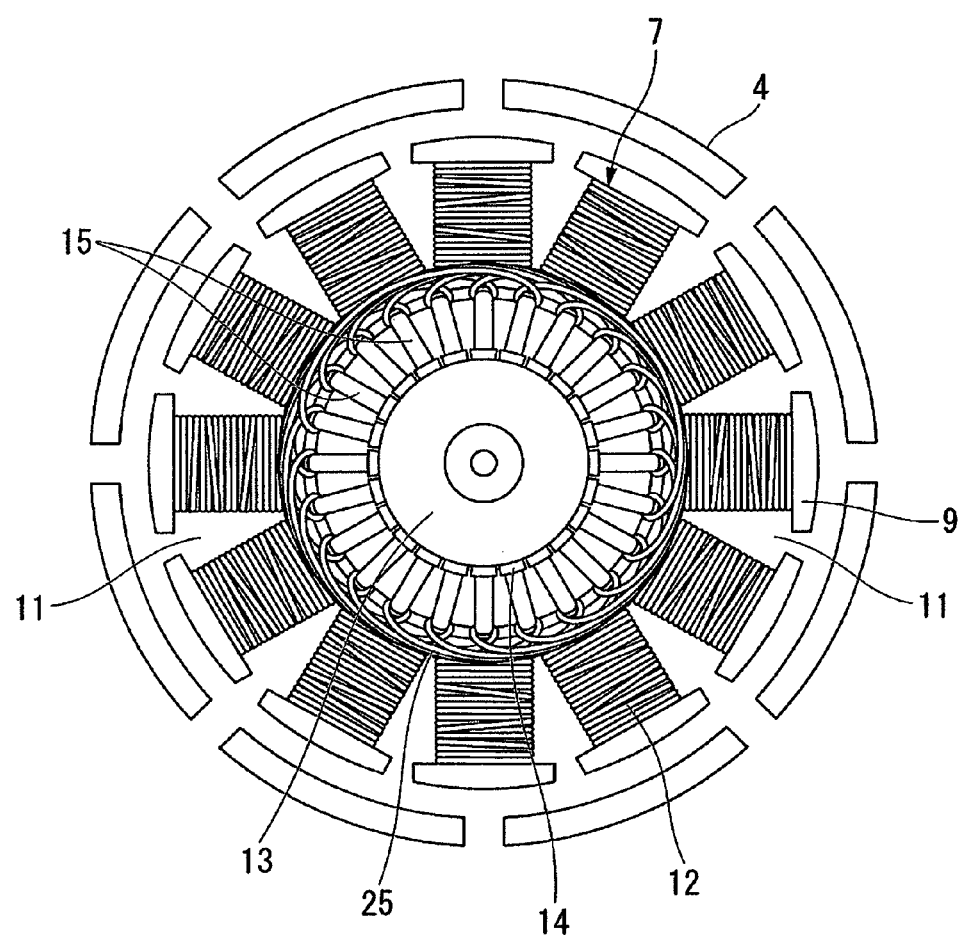
FIG. 2 is a transverse cross-sectional view of the electric motor according to the first embodiment of the present invention.

As shown in FIGS. 1 and 2, an electric motor 1 is a driving source of electric components (e.g., a radiator fan) mounted on a vehicle, and includes a cylindrical yoke 2 having a bottom, and an armature 3 rotatably disposed in the yoke 2. A plurality (8 poles in the first embodiment) of permanent magnets 4 are fixed to an inner circumference of the yoke 2 at equal intervals in a circumferential direction.

The armature 3 includes an armature core 6 fixed to a rotational shaft 5, an armature coil 7 wound around the armature core 6, and a commutator 13 disposed at one end portion of the armature core 6. The armature core 6 includes a plurality of ring-shaped metal plates 8 which are layered in an axial direction. The metal plate 8 is provided on an outer circumferential portion thereof with a plurality (12 in the first embodiment) of T-shaped teeth 9 (refer to FIG. 2) radially disposed at equal intervals in a circumferential direction. An outer circumference of the armature core 6 is provided with slots 11 having a dovetail groove shape between the adjacent teeth 9 by externally fitting the plurality of metal plates 8 onto the rotational shaft 5. A plurality (12 in the first embodiment) of slots 11 are formed at equal intervals in a circumferential direction, and extend in an axial direction. A winding 12 of enamel coating is wound between the slots 11 to form a plurality of armature coils 7 on the outer circumference of the armature core 6.

The commutator 13 is externally fitted onto one end portion of the rotational shaft 5. A plurality (24 in this embodiment) of segments 14 made of a conductive material are attached to an outer circumferential surface of the commutator 13. That is, the commutator 13 is provided with the number of segments 14 that is twice the number of the slots 11. In addition, if the number of the magnetic poles of the permanent magnets 4 is P, the number of the slots 11 is Sr, the number of the segments 14 is Se, and A is a natural number of 2 or more, in order to satisfy $P=4A$, $Sr=6A$, and $Se=12A$, and the number P of the magnetic poles, the number Sr of the slots and the number Se of the segments are set. That is, in the first embodiment, A=2 (a natural number of 2 or more), and P=4A=4×2=8, Sr=6A=6×2=12, and Se=12A=12×2=24.

The segments 14 are made of metal pieces having a shape of an elongated board in an axial direction, and are fixed in parallel at equal intervals in a circumferential direction in a state in which the segments are electrically isolated from each other. A riser 15 is integrally formed at the end portion of the armature core 6 side of each segment 14, the riser being bent toward an outer diameter side thereof. The winding 12, which becomes a winding starting end portion and a winding terminating end portion of the armature coil 7, is hung around the riser 15, and the winding 12 is fixed to the riser 15 by fusing. Consequently, the segment 14 is electrically connected to the armature coil 7 corresponding thereto.

In addition, each of connection lines 25 is hung around the riser 15 corresponding to the segments 14 having the same potential (the segments 14 at intervals of 5 segments in the first embodiment), and the connection line 25 is fixed to the riser 15 by fusing. The connection line 25 serves to cause a short circuit between the segments 14 having the same potential, and is wired between the commutator 13 and the armature core 6.

As shown in FIG. 1, the other end portion of the rotational shaft 5 is rotatably supported by a bearing 16 in a boss protruding from the yoke 2. A cover 17 is installed at an opened end portion of the yoke 2, and a holder stay 18 is attached to the inside of the cover 17. The holder stay 18 is provided with a pair of brush holders 19, and a brush 21 is built in the brush holder 19 in a fashion freely projecting from the brush holder 19 in a state where the brush 21 is pressed by a spring 29. Since a front end portion of the brush 21 is pressed by the spring 29, it comes into slide contact with the commutator 13, so that power is supplied to the commutator 13 from the exterior via the brush 21.

As such, the winding 12 is wound around the electric motor 1 having an 8-pole, 12-slot and 24-segment structure, in which the number P of the magnetic poles of the permanent magnets 4 (magnetic poles) is 8, the number Sr of the slots 11 is 12 and the number Se of the segments 14 is 24.

Figure 3:
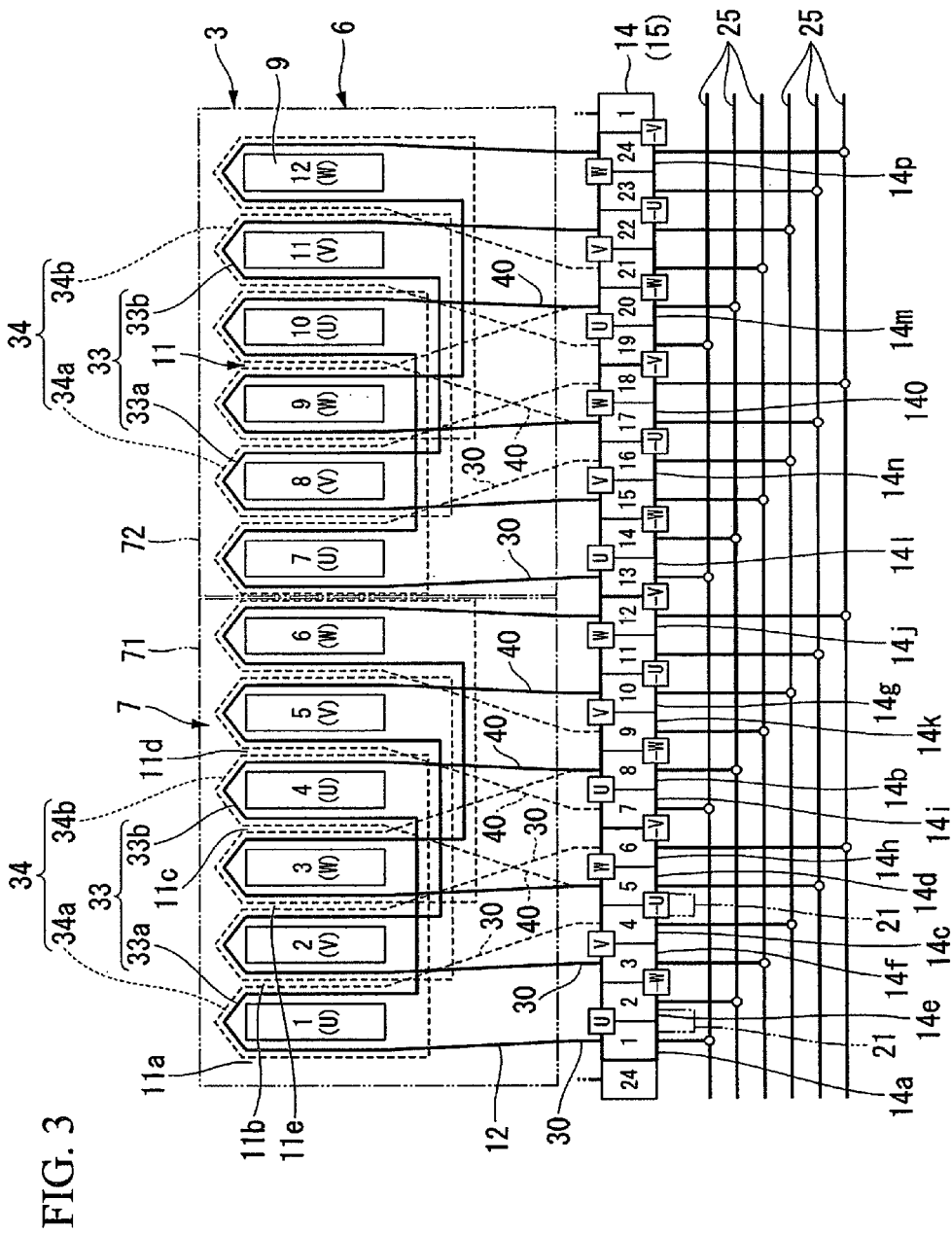
FIG. 3 is a developed view of an armature showing a winding state of an armature coil according to the first embodiment of the present invention.

FIG. 3 is a developed view of the segments 14 (the risers 15) and the teeth 9 in the armature 3, the permanent magnets 4 fixed to the yoke 2 side, and the connection lines 25. An air gap between the adjacent teeth 9 corresponds to the slot 11. In this instance, in the drawing below, each of the segments 14, each of the teeth 9 and the wound winding 12 will be described using reference numerals designated to each component.

As shown in FIG. 3, the segments 14 having the same potential are short-circuited by the connection line 25. That is, the segments 14 at intervals of 6 segments (e.g., a first segment 14a and a seventh segment 14i) are short-circuited by the connection line 25.

In addition, each of the teeth 9 is allocated with a U phase, a V phase, and a W phase in this order. That is, the first, fourth, seventh, and tenth teeth 9 are allocated with the U phase, the second, fifth, eighth, and eleventh teeth 9 are allocated with the V phase, and the third, sixth, ninth, and twelfth teeth 9 are allocated with the W phase.

In addition, the winding 12 wound around each of the teeth 9 forms a first coil group 71 and a second coil group 72 of two three-phase concentrated windings which are disposed point-symmetrically to each other with respect to the rotational shaft 5.

The winding 12 of the first coil group 71 is first hung around the riser 15 of the first segment 14a, and then introduced into a slot 11a between the first and twelfth tooth 9 which are in the vicinity of the first segment 14a, for example, in a case where the winding starting end portion 30 starts to wind around the first segment 14a. Then, the winding 12 is wound around the first tooth 9 n/2 times in a forward direction to form a forward winding coil 33a. In this instance, n is a natural number of 1 or more, and indicates the desired number of turns of the winding of each tooth 9.

The winding 12 is extracted from a slot 11b between the first tooth 9 and the second tooth 9. Then, the winding 12 is introduced into a slot 11c between the third tooth 9 and the fourth tooth 9. The winding 12 is wound around the fourth tooth 9 n/2 times in a forward direction to form a forward winding coil 33b.

After the forward winding coil 33b is formed, the winding 12 is extracted from a slot 11d between the fourth tooth 9 and the fifth tooth 9. Then, the winding 12 is hung around the riser 15 of an eighth segment 14b which is in the vicinity of the fourth tooth 9. A winding terminating end portion 40 of the winding 12 is connected to the eighth segment 14b. Accordingly, a first coil 33 of a U phase is formed between the first segment 14a and the eighth segment 14b, wherein the first coil 33 is wound around the first tooth 9 and the fourth tooth 9 in a forward direction and has a pair of forward winding coils 33a and 33b connected in series to each other.

The eighth segment 14b connected to the winding terminating end portion 40 and a second segment 14e adjacent to the first segment 14a are short-circuited by the connection line 25. For this reason, a potential difference between the first segment 14a and the eighth segment 14b is equal to the potential difference between the adjacent segments. Accordingly, the first coil 33 is electrically connected between the first segment 14a and the second segment 14e which are adjacent to each other (between the adjacent segments). For this reason, it becomes equivalent to the first coil 33 of a U phase being formed between the first segment 14a and the second segment 14e.

Meanwhile, the winding 12 hung around the riser 15 of a fourth segment 14c is introduced into the slot 11b between the first tooth 9 and the second tooth 9 which are in the vicinity of the fourth segment 14c. Then, the coil is wound around the first tooth 9 n/2 times in a reverse direction to form a reverse winding coil 34a.

The winding 12 is extracted from the slot 11a between the first tooth 9 and the twelfth tooth 9, and then introduced into the slot 11d between the fourth tooth 9 and the fifth tooth 9. Then, the coil is wound around the fourth tooth 9 n/2 times in a reverse direction to form a reverse winding coil 34b.

After the reverse winding coil 34b is formed, the winding 12 is extracted from the slot 11c between the third tooth 9 and the fourth tooth 9. Then, the winding 12 is hung around the riser 15 of a fifth segment 14d which is adjacent to the fourth segment 14c and is in the vicinity of the fourth tooth 9. The winding terminating end portion 40 of the winding 12 is connected to the fifth segment 14d. Accordingly, a second coil 34 of a −U phase is formed between the fourth segment 14c and the fifth segment 14d, wherein the second coil 34 is wound around the first tooth 9 and the fourth tooth 9 in a reverse direction and has a pair of reverse winding coils 34a and 34b connected in series to each other.

As such, the armature coil 7 of the U phase which is wound n times is formed at the first tooth 9 and the fourth tooth 9 which correspond to the U phase of the first coil group 71, and has the first coil 33 wound with the winding 12 n/2 times in the forward direction and the second coil 34 wound with the winding 12 n/2 times in the reverse direction.

In addition, among the pair of brushes 21, for example, when one brush 21 abuts between the first segment 14a and the second segment 14e, the other brush 21 abuts between the fourth segment 14c and the fifth segment 14d. That is, the pair of brushes 21 have the same phase, and are correspondingly disposed between the segments 14 to which the first coil 33 wound in the forward direction and the second coil 34 wound in the reverse direction are connected.

Simultaneously, in a case where the winding starting end portion 30 of the winding 12 starts to wind at a third segment 14f, the coil is introduced into the slot 11b between the first tooth 9 and the second tooth 9 which are in the vicinity of the third segment 14f. Then, the coil is respectively wound around the second tooth 9 and the fifth tooth 9, which correspond to the V phase of the first coil group 71, n/2 times in the forward direction to form the forward winding coils 33a and 33b, thereby forming the first coil 33 of the V phase. After that, the coil is connected to a tenth segment 14g which is in the vicinity of the fifth tooth 9.

Meanwhile, the winding 12 hung around the riser 15 of the sixth segment 14d is introduced into the slot 11e between the second tooth 9 and the third tooth 9 which are in the vicinity of the sixth segment 14d. Then, the winding 12 is respectively wound around the second tooth 9 and the fifth tooth 9 n/2 times in the reverse direction to form the reverse winding coils 34a and 34b, thereby forming the second coil 34 of the −V phase. After that, the winding terminating end portion 40 is connected to the seventh segment 14i which is in the vicinity of the fifth tooth 9.

As such, the armature coil 7 of the V phase which is wound n times is formed at the second tooth 9 and the fifth tooth 9 which correspond to the V phase of the first coil group 71, and has the first coil 33 of the V phase wound with the winding 12 n/2 times in the forward direction and the second coil 34 of the −V phase wound with the winding 12 n/2 times in the reverse direction.

This is similarly performed with respect to the third tooth 9 and the sixth tooth 9 which correspond to the W phase of the first coil group 71. That is, the first coil 33 and the second coil 34 are respectively wound around the third tooth 9 and the sixth tooth 9, and the winding starting end portion 30 and the winding terminating end portion 40 are connected to the segments 14 corresponding to these coils, that is, the fifth segment 14d and a twelfth segment 14j, and the eighth segment 14b and a ninth segment 14k, respectively.

Accordingly, the first coil group 71 of the three-phase (U, V and W phases) concentrated winding structure is formed from the first tooth 9 to the sixth tooth 9.

Here, since the segments 14 having the same potential are short-circuited by the connection line 25, the first coils 33 with each phase, around which the winding 12 is wound in the forward direction, are set as the U phase, the V phase and the W phase, respectively. In addition, the second coils 34 with each phase, around which the winding 12 is wound in the reverse direction, are set as the −U phase, the −V phase and the −W phase, respectively. In this case, the coils 33 and 34 of the U, −W, V, −U, W, and −V phases are configured to be electrically connected to each other in this order such that both neighbors between the adjacent segments 14 from the first segment 14a to the twelfth segment 14j have different phases alternating in forward and reverse directions. That is, the first coil 33 of the U phase is electrically connected between the first segment 14a and the second segment 14e. In addition, the winding terminating end portion 40 of the second coil 34 of a different phase, that is, the −V phase, is electrically connected to the first segment 14a. Moreover, the winding starting end portion 30 of the second coil 34 of a different phase, that is, the −W phase, is electrically connected to the second segment 14e.

Meanwhile, the winding 12 of the second coil group 72, which is formed at a position point-symmetric to the first coil group 71 with respect to the rotational shaft 5, is wound around each of the teeth 9 from the seventh tooth 9 to the twelfth tooth 9.

That is, the first coil 33 (the forward winding coils 33a and 33b) and the second coil 34 (the reverse winding coils 34a and 34b) are wound around the seventh tooth 9 and the tenth tooth 9, which correspond to the U phase of the second coil group 72. The winding starting end portion 30 and the winding terminating end portion 40 are respectively connected to a thirteenth segment 14l and a twentieth segment 14m, which correspond thereto, and a sixteenth segment 14n and a seventeenth segment 14o, which correspond thereto.

Similar to each of the teeth 9 corresponding to the U phase, the first coil 33 and the second coil 34 are wound around the eighth tooth 9 and the eleventh tooth 9 which correspond to the V phase of the second coil group 72, and the ninth tooth 9 and the twelfth tooth 9 which correspond to the W phase. The winding starting end portions 30 and the winding terminating end portions 40 in the first and second coils 33 and 34 of each phase are electrically connected between the adjacent segments 14 from the thirteenth segment 14l to the twenty-fourth segment 14p in the order of U, −W, V, −U, W, and −V phases.

Accordingly, according to the above-described first embodiment, the first coil group 71 and the second coil group 72, which are the three-phase (the U, V and W phases) concentrated winding structures, can be connected to the segment 14 in a parallel state. That is, since the number of parallel circuits in each of the coil groups 71 and 72 is two, the number of the parallel circuits can be increased to 4 by connecting each of the coil groups to the segment 14 in the parallel state. For this reason, as compared with the case where the number of the parallel circuits is two, it is possible to utilize the winding 12 with a thin line diameter. As the line diameter is thin, it is possible to easily perform the winding task on each of the teeth 9 of the winding 12.

In addition, the commutator 13 is provided with the number of the segments 14 which is twice the number of the slots 11. For this reason, as compared with the case where the number of the segments 14 is set to be equal to the number of the slots 11 like the related art, it is possible to decrease the voltage between the segments 14. Therefore, it is possible to suppress the discharge from being produced between the segment 14 and the brush 21 that comes into slide contact with the segment 14.

In addition, the armature coil 7 of each phase is configured of the first coil 33 wound in a forward direction, and the second coil 34 wound in a reverse direction, so that the winding 12 wound for every phase can be connected between the adjacent segments 14.

That is, in the multisegmental electric motor, in which the segments 14 are set to be twice the number of the slots 11, there are portions in which the winding 12 wound for each phase is connected to the same segment 14. In this instance, since the center position of the rectification is changed by the connection position between the winding starting end portion 30 and the winding terminating end portion 40 of each winding 12 with respect to the segment 14, the rectification may be deteriorated.

However, according to the first embodiment, since the winding 12 wound for each phase can be connected between the adjacent segments 14, the center of rectification for each phase can be set to the center between the adjacent segments 14. For this reason, the center of rectification for each phase can be easily recognized, and thus each of the brushes 21 is installed such that the center of rectification and the center of the brush 21 coincide, thereby improving the rectifying characteristics and thus improving the motor characteristics of the electric motor 1.

In addition, for example, in a case where the winding 12 to be wound around each of the teeth 9 is wound, in a lap-winding (shunt-winding) fashion, between the slots 11 at a predetermined interval, a distribution path of the winding 12 extends, so that the armature coil 7 is wound thickly. However, as in the first embodiment, it is possible to solve the thick winding by winding the winding 12 in a concentrated winding manner. For this reason, as compared with the lap-winding fashion, it is possible to reduce the cost of the winding 12, and simultaneously, to promote reduction in size and weight of the electric motor 1.

Next, a second embodiment of the present invention will be described with reference to FIG. 4.

Figure 4:
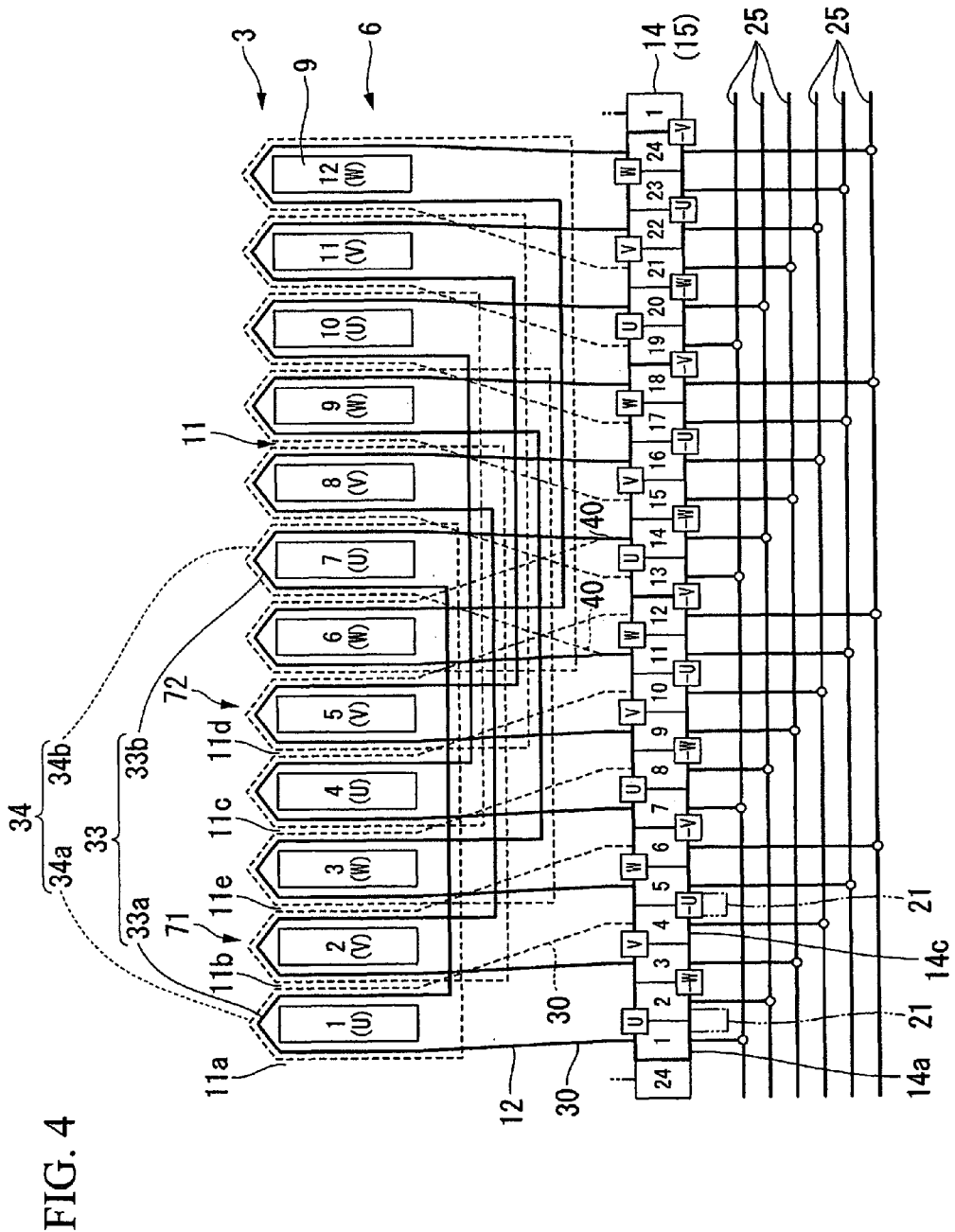
FIG. 4 is a developed view of an armature showing a winding state of an armature coil according to a second embodiment of the present invention.

FIG. 4 is a developed view of an armature 3 showing a winding state of an armature coil 7, and the basic configuration is substantially identical to that of the above-described first embodiment. Therefore, in FIG. 4, the same members and parts as those of FIG. 3 are denoted by the same reference numerals, and detailed descriptions thereof will be omitted (hereinafter, identical to the embodiments below).

In addition, in the embodiments below, the basic configuration of the electric motor 1, which, for example, includes a yoke 2 having a permanent magnet 4, and an armature 3 rotatably disposed in the yoke 2, is identical to that of the above-described first embodiment.

Here, in the second embodiment, the winding 12 is wound in series around each of the teeth 9 of three phases (U, V and W phases), which are at intervals of 3 teeth, in a concentrated winding manner, and two coil groups 71 and 72 are formed at the armature core 6 by setting the teeth of three phases as one coil group.

That is, the first coil 33 of each phase and the second coil 34 of each phase are formed at the teeth 9 (i.e., the first, second and third teeth 9) of three phases and at the teeth 9 (i.e., the seventh, eighth and ninth teeth 9) of three phases which are at intervals of 3 teeth 9 from the above teeth, thereby forming the first coil group 71.

Meanwhile, the first coil 33 of each phase and the second coil 34 of each phase are formed at the teeth 9 (i.e., the fourth, fifth and sixth teeth 9) of three phases and at the teeth 9 (i.e., the tenth, eleventh and twelfth teeth 9) of three phases which are at intervals of 3 teeth from the above teeth, thereby forming the second coil group 72.

In addition, the winding starting end portions 30 and the winding terminating end portions 40 in the first and second coils 33 and 34 of each phase are electrically connected between the adjacent segments 14 in the vicinity of each extracted (introduced) slot 11 in the order of U, −W, V, −U, W, and −V phases.

Therefore, the second embodiment has the same effect as in the above-described first embodiment.

Figure 5:
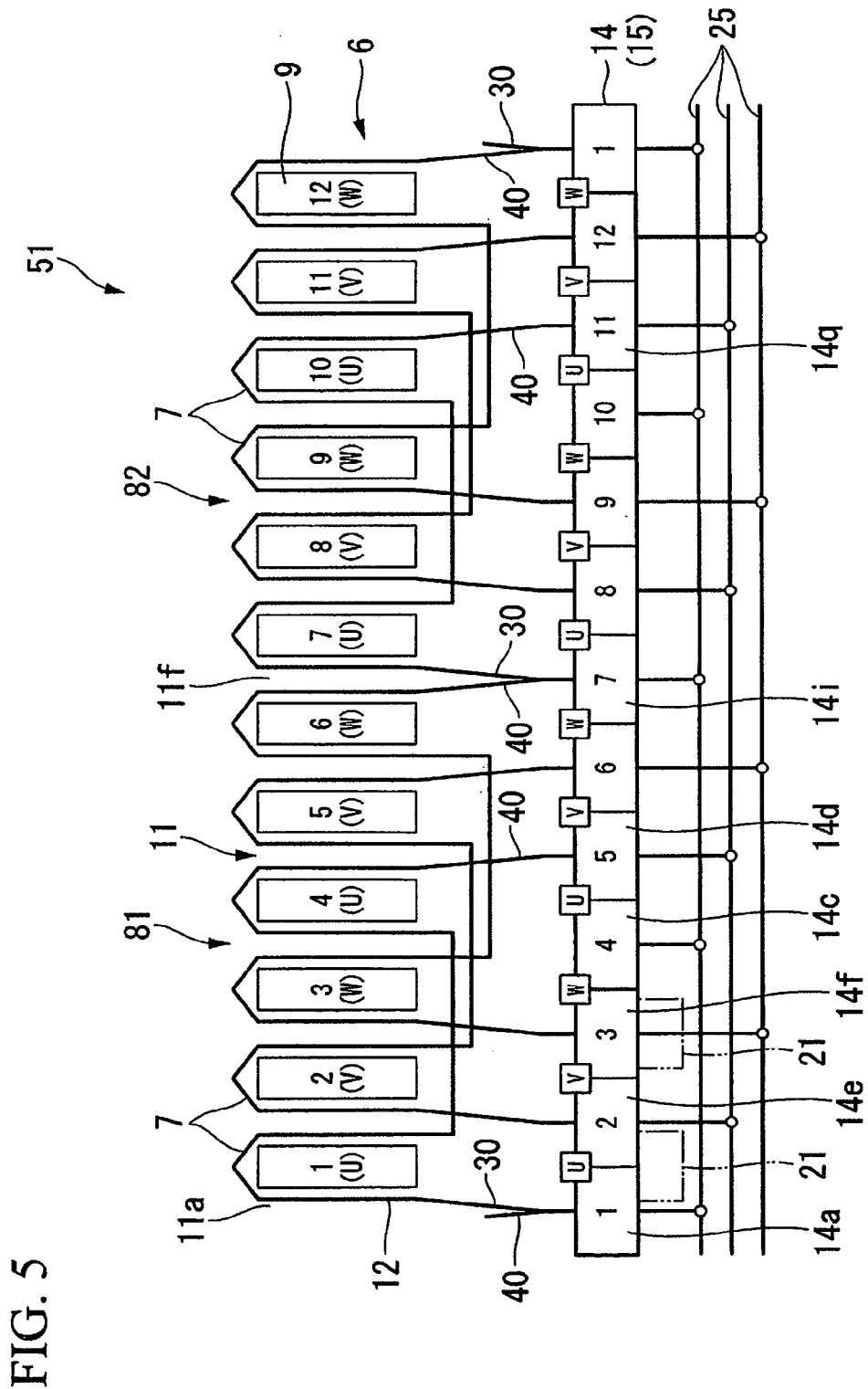
FIG. 5 is a developed view of an armature showing a winding state of an armature coil according to a third embodiment of the present invention.

Next, a third embodiment of the present invention will be described with reference to FIG. 5.

In the third embodiment, an electric motor 51 has an 8-pole, 12-slot and 12-segment structure, in which the number of poles of permanent magnets 4 is 8, the number of slots 11 is 12, and the number of segments 14 is 12. That is, if the number of the magnetic poles of the permanent magnets 4 is P, the number of the slots 11 is Sr, the number of the segments 14 is Se, and A is a natural number of 2 or more, in order to satisfy $$P=4A, Sr=6A, \text{ and } Se=6A,$$

the number P of the magnetic poles, the number Sr of the slots and the number Se of the segments are set, and in the third embodiment, A=2 (even number of 2 or more), and, $$P=4A=4\times2=8, Sr=6A=6\times2=12, Se=6A=6\times2=12.$$

In addition, the segments 14 having the same potential are short-circuited by a connection line 25. That is, the segments 14 at intervals of 2 segments (e.g., a first segment 14a and a fourth segment 14c) are short-circuited by the connection line 25. Moreover, among a pair of brushes 21, for example, when one brush 21 abuts between the first segment 14a and a second segment 14e, the other brush 21 abuts against a third segment 14f.

In addition, a winding 12 wound around each of the teeth 9 of the electric motor 51 constituted as described above forms a first coil group 81 and a second coil group 82 of three-phase concentrated windings which are disposed point-symmetrically to each other with respect to a rotational shaft 5.

The winding 12 of the first coil group 81 is introduced into a slot 11a between the first and twelfth teeth 9, which are in the vicinity of the first segment 14a, for example, in a case where a winding starting end portion 30 starts to wind around the first segment 14a. Then, the winding 12 is wound around the first and fourth tooth 9 which correspond to the U phase of the first coil group 81 n times in a forward direction to form an armature coil 7 of the U phase. After that, the coil is connected to a fifth segment 14d which is in the vicinity of the fourth tooth 9.

This is similarly performed with respect to the second tooth 9 and the fifth tooth 9, which correspond to the V phase of the first coil group 81, and the third tooth 9 and the sixth tooth 9, which correspond to the W phase. The armature coils 7 of U, V and W phases are electrically and sequentially connected between the adjacent segments 14, from the first segment 14a to a seventh segment 14i, in this order.

Meanwhile, for example, in a case where the winding starting end portion 30 of the winding 12 of the second coil group 82 starts to wind at the seventh segment 14a, the coil is introduced into a slot 11f between the sixth tooth 9 and the seventh tooth 9 which are in the vicinity of the seventh segment 14a. Then, the coil is respectively wound around the seventh tooth 9 and the tenth tooth 9, which correspond to the U phase of the second coil group 82, n times in the forward direction to form the armature coil 7 of the U phase. After that, the coil is connected to an eleventh segment 14q which is in the vicinity of the tenth tooth 9.

This is similarly performed with respect to the eighth tooth 9 and the eleventh tooth 9 which correspond to the V phase of the second coil group 82, and the ninth tooth 9 and the twelfth tooth 9 which correspond to the W phase. Then, the armature coils 7 of U, V and W phases are electrically and sequentially connected between the adjacent segments 14, from the seventh segment 14i to the first segment 14a, in this order.

Here, the winding terminating end portion 40 of the armature coil 7 of the W phase in the first coil group 81 and the winding starting end portion 30 of the armature coil 7 of the U phase in the second coil group 82 are connected to the same seventh segment 14i, respectively, so that both end portions 30 and 40 are connected to each other.

In addition to this, the winding starting end portion 30 of the armature coil 7 of the U phase in the first coil group 81 and the winding terminating end portion 40 of the armature coil 7 of the W phase in the second coil group 82 are connected to the same first segment 14a, respectively, so that both end portions 30 and 40 are connected to each other.

Therefore, according to the above-described third embodiment, since the first coil group 81 and the second coil group 82 which have three-phase concentrated winding structures are respectively connected in parallel to the segment 14, the number of parallel circuits is 4. For this reason, it has the same effects as those of the first embodiment.

Figure 6:
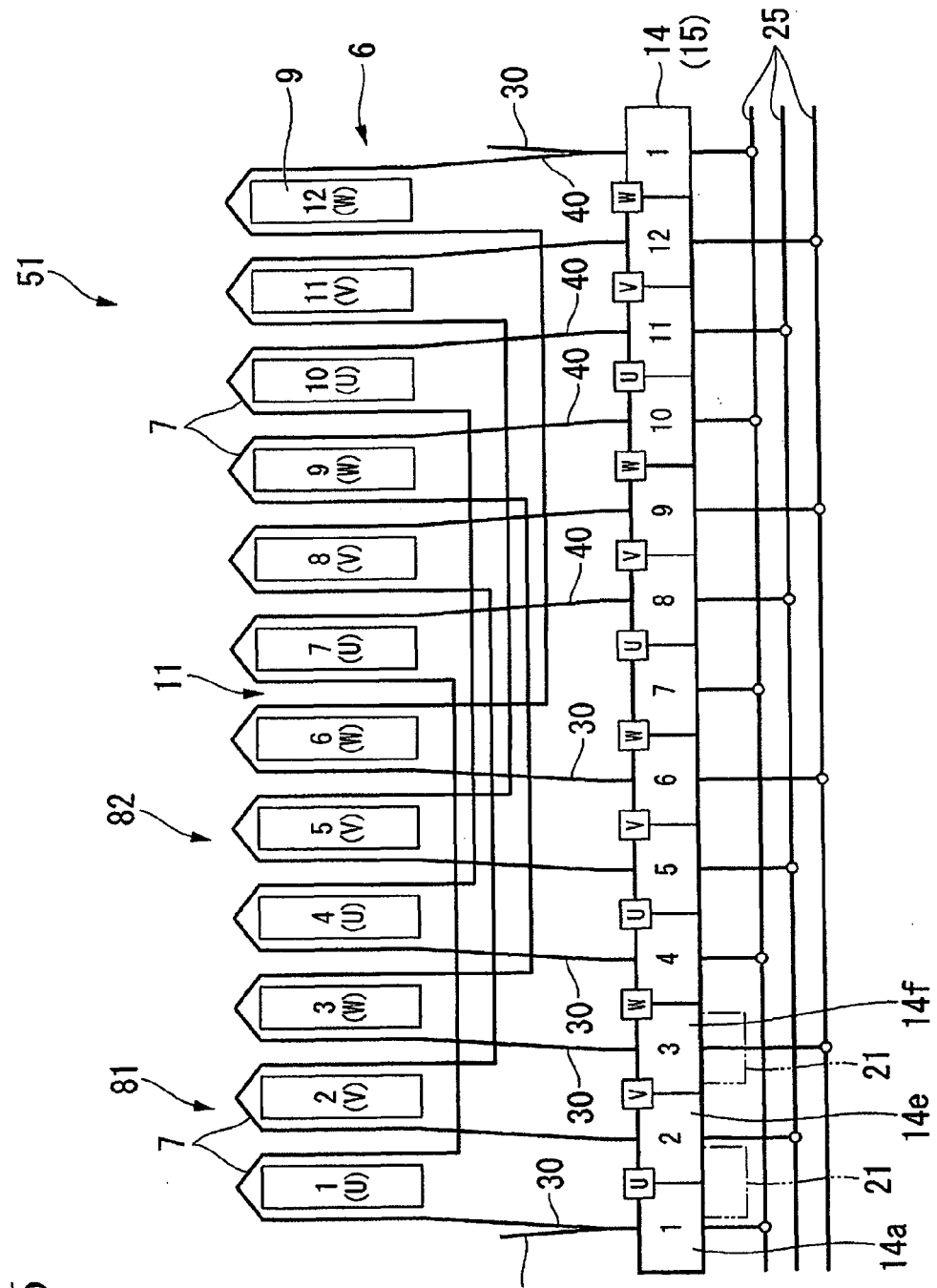
FIG. 6 is a developed view of an armature showing a winding state of an armature coil according to a fourth embodiment of the present invention.
Figure 7:
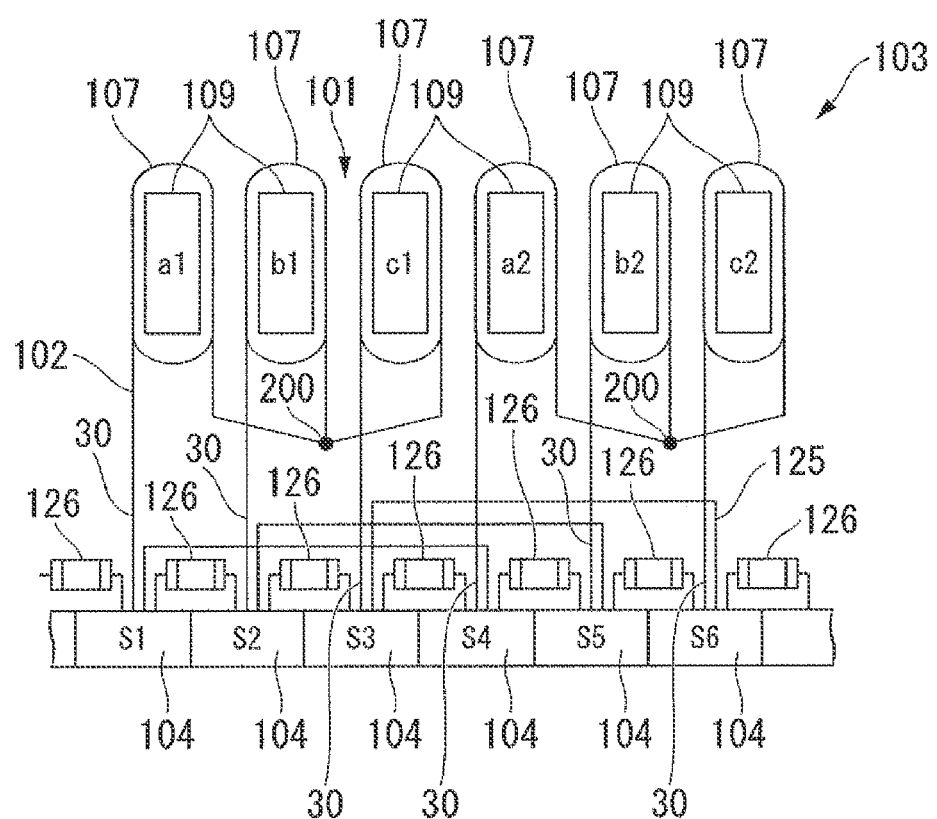
FIG. 7 is a developed view of an armature showing a winding state of an armature coil according to the related art.

Next, a fourth embodiment of the present invention will be described with reference to FIG. 6.

An electric motor 51 of the fourth embodiment has an 8-pole, 12-slot and 12-segment structure, similar to the electric motor 51 of the third embodiment.

In the fourth embodiment, the basic configuration of the electric motor 51 having an 8-pole, 12-slot and 12-segment structure, in which the number of poles of permanent magnets 4 is 8, the number of slots 11 is 12, and the number of segments 14 is 12, is identical to that of the third embodiment.

Here, in the fourth embodiment, the winding 12 is wound in series around each of the teeth 9 of three phases, which are at intervals of 3 teeth, in a concentrated winding manner, and two coil groups 71 and 72 are formed at the armature core 6 by setting the teeth of three phases as one coil group.

That is, the first coil group 81 is formed at the teeth 9 (i.e., the first, second and third teeth 9) of three phases and at the teeth 9 (i.e., the seventh, eighth and ninth teeth 9) of three phases which are at intervals of 3 teeth 9 from the above teeth. In addition, the second coil group 82 is formed at the teeth 9 (i.e., the fourth, fifth and sixth teeth 9) of three phases and at the teeth 9 (i.e., the tenth, eleventh and twelfth teeth 9) of three phases which are at intervals of 3 teeth from the above teeth.

The winding starting end portions 30 and the winding terminating end portions 40 in the armature coil 7 of each phase are electrically connected between the adjacent segments 14 in the vicinity of each extracted (introduced) slot 11 in the order of U, V, and W phases.

In addition, the winding starting end portion 30 of the armature coil 7 of the U phase in the first coil group 81 and the winding terminating end portion 40 of the armature coil 7 of the W phase in the second coil group 82 are connected to the same first segment 14a, respectively, so that the winding starting end portions 30 and the winding terminating end portions 40 are connected to each other.

Therefore, the above-described fourth embodiment has the same effects as those of the third embodiment.

The present invention is not limited to the above embodiments but, needless to say, can be variously modified without deviating from the subject matter of the invention.

In addition, in the above-described embodiments, it has been described that the winding starting end portions 30 and the winding terminating end portions 40 in each of the windings 12 are electrically connected between the adjacent segments 14 in the vicinity of each extracted (introduced) slot 11 and respectively corresponding to each phase. However, it is not limited thereto, and if the winding starting end portions 30 and the winding terminating end portions 40 are connected to the segments 14 of the corresponding phase, the end portions are not necessarily connected to the segment 14 in the vicinity of each extracted (introduced) slot 11.

In addition, it has been described in the first and second embodiments that the electric motor 1 has an 8-pole, 12-slot and 24-segment structure, in which the number P of the magnetic poles of the permanent magnets 4 (magnetic poles) is 8, the number Sr of the slots 11 is 12 and the number Se of the segments 14 is 24. This is not limited thereto, as long as the number P of the magnetic poles, the number Sr of the slots and the number Se of the segments are set in order to satisfy $P=4A$, $Sr=6A$, and $Se=12A$.

In addition, it has been described in the third and fourth embodiments that the electric motor 51 has an 8-pole, 12-slot and 12-segment structure, in which the number P of the magnetic poles of the permanent magnets 4 (magnetic poles) is 8, the number Sr of the slots 11 is 12 and the number Se of the segments 14 is 12. This is not limited thereto, as long as the number P of the magnetic poles, the number Sr of the slots and the number Se of the segments are set in order to satisfy $P=4A$, $Sr=6A$, and $Se=6A$.

INDUSTRIAL APPLICABILITY

The present invention can be applied to an electric motor or the like capable of easily performing a winding task, even when a winding is wound in a three-phase concentrated winding manner.

The invention claimed is:

1. An electric motor comprising:
a rotational shaft rotatably supported by a yoke having a plurality of magnetic poles;
a plurality of teeth attached to the rotational shaft and extending in a radial direction to allow windings to be wound therearound;
an armature core formed between the teeth and provided with a plurality of slots which extend in an axial direction;
a commutator installed on the rotational shaft adjacent to the armature core and having a plurality of segments which are disposed in a circumferential direction; and
a short-circuit member which short-circuits the segments having the same potential, among the plurality of segments,
wherein the number P of magnetic poles, the number Sr of the slots, and the number Se of the segments are set in order to satisfy $P=4A$, $Sr=6A$, and $Se=12A$, when A is a natural number of 2 or more; the number of the magnetic poles is P, the number of the slots is Sr, and the number of the segments is Se, and
the windings wound around each of the teeth form two coil groups of three-phase concentrated windings which are disposed point-symmetrically to each other with respect to the rotational shaft,
wherein each of the coil groups includes a first coil, in which the windings are wound around the teeth in a forward direction, and a second coil, in which the windings are wound around the teeth in a reverse direction, and
when each of the teeth is allocated with a U phase, a V phase, and a W phase in this order in a circumferential direction so that the first coil wound for each phase is set to be coils of the U phase, the V phase, and the W phase, and the second coil wound for each phase is set to be coils of the −U phase, the −V phase, and the −W phase, the coils of the U, −W, V, −U, W and −V phases are electrically connected between the adjacent segments in this order.

2. An electric motor comprising:
a rotational shaft rotatably supported by a yoke having a plurality of magnetic poles;
a plurality of teeth attached to the rotational shaft and extending in a radial direction to allow windings to be wound therearound;
an armature core formed between the teeth and provided with a plurality of slots which extend in an axial direction;
a commutator installed on the rotational shaft adjacent to the armature core and having a plurality of segments which are disposed in a circumferential direction; and
a short-circuit member which short-circuits the segments having the same potential, among the plurality of segments,
wherein the number P of magnetic poles, the number Sr of the slots, and the number Se of the segments are set in order to satisfy $P=4A$, $Sr=6A$, and $Se=12A$, when A is a natural number of 2 or more, the number of the magnetic poles is P, the number of the slots is Sr, and the number of the segments is Se, and
each of the teeth is allocated with U, V and W phases in this order in a circumferential direction,
wherein the windings are wound in series around the teeth of three phases, which are at intervals of three teeth in a concentrated winding manner to form one coil group, so that two coil groups are formed on the armature core,
each of the coil groups includes a first coil, in which the windings are wound around the teeth in a forward direction, and a second coil, in which the windings are wound around the teeth in a reverse direction, and
when the first coil wound for each phase is set to be coils of the U, V and W phases, and the second coil wound for each phase is set to be coils of the −U, −V and −W phases, the coils of the U, −W, V, −U, W and −V phases are electrically connected between the adjacent segments in this order.

3. The electric motor according to claim 1 or 2, wherein the electric motor has an 8-pole, 12-slot and 24-segment structure, in which the number of the magnetic poles the number of the slots is 12, and the number of the segments is 24, and
the first coil and the second coil constituting each coil group have two coils of the same phase.

4. An electric motor comprising:
a rotational shaft rotatably supported by a yoke having a plurality of magnetic poles;
a plurality of teeth attached to the rotational shaft and extending in a radial direction to allow windings to be wound therearound;
an armature core formed between the teeth and provided with a plurality of slots which extend in an axial direction;
a commutator installed on the rotational shaft adjacent to the armature core and having a plurality of segments which are disposed in a circumferential direction; and
a short-circuit member which short-circuits the segments having the same potential, among the plurality of segments,
wherein the number P of magnetic poles, the number Sr of the slots, and the number Se of the segments are set in order to satisfy $P=4A$, $Sr=6A$, and $Se=6A$, when A is a natural number of 0.2 or more, the number of the magnetic poles is P, the number of the slots is Sr, and the number of the segments is Se, and the windings wound around each of the teeth form two coil groups of three-phase concentrated windings which are disposed point-symmetrically to each other with respect to the rotational shaft, wherein when each of the teeth is allocated with U, V, and W phases in this order in a circumferential direction, and the windings wound for each phase are set to be coils of the U, V, and W phases, a winding terminating end portion of the coil of the W phase in one coil group and a winding starting end portion of the coil of the U phase in the other coil group are, connected to each other, and a winding starting end portion of the coil of the U phase in one coil group and a winding terminating end portion of the coil of the W phase in the other coil group are connected to each other, and the coils of the U, V, and W phases are electrically connected between the adjacent segments in this order.

5. An electric motor comprising:
a rotational shaft rotatably supported by a yoke having a plurality of magnetic poles;
a plurality of teeth attached to the rotational shaft and extending in a radial direction to allow windings to be wound therearound;
an armature core formed between the teeth and provided with a plurality of slots which extend in an axial direction;
a commutator installed on the rotational shaft adjacent to the armature core and having a plurality of segments which are disposed in a circumferential direction; and
a short-circuit member which short-circuits the segments having the same potential, among the plurality of segments, wherein the number P of magnetic poles, the number Sr of the slots, and the number Se of the segments are set in order to satisfy $P=4A$, $Sr=6A$, and $Se=6A$, when A is a natural number of 2 or more, the number of the magnetic poles is P, the number of the slots is Sr, and the number of the segments is Se, each of the teeth is allocated with U, V, and W phases in this order in a circumferential direction, and the windings are wound in series around the teeth of three phases which are at intervals of three teeth in a concentrated winding manner to form one coil group, so that two coil groups are formed in the armature core, wherein when the windings wound for each phase are set to be coils of the U, V, and W phases, a winding starting end portion of the coil of the U phase in one coil group and a winding terminating end portion of the coil of the W phase in the other coil group are connected to each other, and the coils of the U, V, and W phases are electrically connected between the adjacent segments in this order.

6. The electric motor according to claim 4 or 5, wherein the electric motor has an 8-pole, 12-slot and 12-segment structure, in which the number of the magnetic poles is 8, the number of the slots is 12, and the number of the segments is 12, and each coil group has two coils of the same phase.

* * * * *